United States Patent
Xu et al.

(10) Patent No.: US 11,941,823 B2
(45) Date of Patent: Mar. 26, 2024

(54) ARTICLES FOR DISRUPTING AUTOMATED VISUAL OBJECT TRACKING PROCESSES

(71) Applicant: ELEMENT AI INC., Montreal (CA)

(72) Inventors: Anqi Xu, Montreal (CA); Ousmane Dia, Montreal (CA); Rey Reza Wiyatno, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 278 days.

(21) Appl. No.: 17/438,865

(22) PCT Filed: Mar. 13, 2020

(86) PCT No.: PCT/CA2020/050342
§ 371 (c)(1),
(2) Date: Sep. 13, 2021

(87) PCT Pub. No.: WO2020/181391
PCT Pub. Date: Sep. 17, 2020

(65) Prior Publication Data
US 2022/0058815 A1  Feb. 24, 2022

Related U.S. Application Data

(60) Provisional application No. 62/818,274, filed on Mar. 14, 2019.

(51) Int. Cl.
G06T 7/246 (2017.01)
B60R 11/04 (2006.01)
(Continued)

(52) U.S. Cl.
CPC .............. *G06T 7/251* (2017.01); *B60R 11/04* (2013.01); *G06N 20/00* (2019.01); *G06T 7/40* (2013.01); *G06V 20/64* (2022.01)

(58) Field of Classification Search
None
See application file for complete search history.

(56) References Cited

U.S. PATENT DOCUMENTS 9,767,568 B2 * 9/2017 Ikenoue .................... G06T 7/12
10,354,127 B2 * 7/2019 Albertson .............. H04N 7/181
(Continued)

OTHER PUBLICATIONS

Biggio et al., "Adversarial pattern classification using multiple classifiers and randomisation", Joint IAPR International Workshops on Statistical Techniques in Pattern Recognition (SPR) and Structural and Syntactic Pattern Recognition (SSPR), Springer, Berlin, Heidelberg, 2008, pp. 500-509.
(Continued)

*Primary Examiner* — Anand P Bhatnagar
(74) *Attorney, Agent, or Firm* — BCF LLP

(57) ABSTRACT

System and method for producing an adversarial article that may be used to disrupt an automated visual tracking process. An input module receives input related to a specific automated visual tracking process. Based on that input, a pattern-design module generates an adversarial pattern. The adversarial pattern may then be applied to an article, which may be any kind of physical or virtual object. The tracker's normal processing modes are disrupted when the tracker attempts to process an image containing the adversarial article(s). The tracker may be mounted on an autonomous vehicle, a mobile robot, or other mobile or stationary camera surveillance system.

20 Claims, 11 Drawing Sheets

(51) Int. Cl.
    *G06N 20/00*     (2019.01)
    *G06T 7/40*     (2017.01)
    *G06V 20/64*     (2022.01)

(56) References Cited

U.S. PATENT DOCUMENTS

| | | | | |
|---|---|---|---|---|
| 10,467,791 | B2* | 11/2019 | Noh | G06F 3/04847 |
| 11,543,502 | B2* | 1/2023 | Hoch | H04K 3/825 |
| 2008/0169929 | A1* | 7/2008 | Albertson | G06T 7/33 |
| | | | | 340/573.1 |
| 2009/0198640 | A1* | 8/2009 | To | G06N 20/10 |
| | | | | 706/52 |
| 2012/0140042 | A1* | 6/2012 | Albertson | G06V 20/52 |
| | | | | 348/46 |
| 2016/0321498 | A1* | 11/2016 | Albertson | G01V 5/0008 |
| 2017/0186291 | A1* | 6/2017 | Wenus | H04N 23/45 |
| 2021/0025679 | A1* | 1/2021 | Hoch | H04K 3/62 |
| 2021/0288981 | A1* | 9/2021 | Numainville | H04L 63/1441 |
| 2022/0164643 | A1* | 5/2022 | Charnock | G06N 3/04 |

OTHER PUBLICATIONS

Yuan et al., "Adversarial examples: Attacks and defenses for deep learning", IEEE transactions on neural networks and learning systems, Jan. 14, 2019; arXiv:1712.07107v3 [cs.LG] Jul. 7, 2018, pp. 1-20.

International Search Report and Written Opinion with regard to the International Patent Application No. PCT/CA2020/050342 dated May 25, 2020.

Athalye et al., "Synthesizing Robust Adversarial Examples", ICML 2018, https://arxiv.org/pdf/1707.07397.pdf, 19 pages.

Held et al., "Learning to Track at 100 FPS with Deep Regression Networks", ECCV 2016, arXiv:1604.01802v2 [cs.CV] Aug. 16, 2016, pp. 1-26.

* cited by examiner

ARTICLES FOR DISRUPTING AUTOMATED VISUAL OBJECT TRACKING PROCESSES

CROSS-REFERENCE TO RELATED APPLICATIONS

The present application is a National Stage of International Application No. PCT/CA2020/050342, filed on Mar. 13, 2020, which claims priority to U.S. Provisional Patent Application No. 62/818,274, filed on Mar. 14, 2019, each of which is incorporated herein by reference in its entirety.

TECHNICAL FIELD

The present invention relates to automated object trucking. More specifically, the present invention relates to articles that disrupt automated visual tracking of objects and parts.

BACKGROUND

One of the primary focus areas in AI and machine learning has been automated image recognition. Automated image recognition processes, and particularly automated visual object tracking processes, have applications in a wide variety of fields. As an example, automated visual tracking systems might be used to record traffic patterns at intersections, or to 'follow' a specific vehicle through a series of intersections and roadways. In another example, retailers may wish to track specific customers throughout a store visit, to determine the length of time customers spend looking at an item or engaging with staff. Many other examples may be suggested, including the analysis of satellite imagery or scientific data—for instance, an automated visual object tracking process might be used to track the movements of an animal population in the wild. In particular, automated object tracking systems can be used to steer mobile robots and vehicles, such as drones and autonomous road vehicles. Note, however, that not all such robots have legitimate purposes, and even when they do, individuals may not wish to be tracked by a robot.

Many current automated image recognition systems, which are generally based on machine-learning systems, can be misled using "adversarial" images. Producing such images generally involves making minor modifications to a source image that take advantage of particular features of a specific automated image recognition system, and that cause that system to misinterpret the image. For instance, applying small but precise modifications to an image of a cat may mislead an automated system into classifying that image as an image of a bird (or of a truck, or of any other user-determined class). Some adversarial approaches can be applied to real-world objects, such as stop signs, to cause those objects to be misclassified by particular systems.

However, misclassification may not always be sufficient. As may be understood, visual object tracking is different from image classification. For instance, there is no task-agnostic discrete condition when a system fails to track a target, in contrast to the clear condition when an image of a cat is misclassified as a non-cat label. Also, visual tracking is arguably more challenging than image classification, since the tracked target may change in appearance, positioning over time, and so the tracking system must adapt to these dynamical changes in order to maintain a tracking lock. Consequently, the method to generate adversarial examples for image classification systems may not be enough for an individual who, for whatever reason, may not wish to be tracked. Thus, there is a need for systems and methods to allow individuals to disrupt the normal processing modes of automated visual object tracking systems and to thereby prevent tracking.

SUMMARY

The present invention provides a system and method for producing an adversarial article that may be used to disrupt an automated visual tracking process (or "tracker"). An input module receives input related to a specific automated visual tracking process. Based on that input, a pattern-design module generates an adversarial pattern. The adversarial pattern may then be applied to an article, with the article being any kind of physical or virtual object. The tracker's normal processing modes are disrupted when the tracker attempts to process an image that contains the article with the adversarial pattern. The tracker may be mounted on a drone or on some other mobile or stationary camera surveillance system.

In a first aspect, the present invention provides a method for producing an adversarial article for use against a visual tracking process, said method comprising the steps of:
(a) receiving input related to a specific automated visual tracking process;
(b) based on said input, generating an adversarial pattern for said specific automated visual tracking process; and
(c) applying said adversarial pattern to an article to thereby produce said adversarial article,
wherein a normal processing mode of said specific automated visual tracking process is disrupted when an image of said adversarial article is processed by said automated visual tracking process.

In a second aspect, the present invention provides a system for producing an adversarial article, said system comprising:
an input module for receiving input related to a specific automated visual tracking process;
a pattern-design module for generating at least one pattern for said specific automated visual tracking process, wherein said at least one pattern is generated based on said input; and
an article,
wherein said adversarial pattern is applied to said article to thereby produce said adversarial article, and
wherein a normal processing mode of said specific automated image recognition process is disrupted when an image of said adversarial article is processed by said automated visual tracking process.

In a third aspect, the present invention provides non-transitory computer-readable media having encoded thereon computer-readable and computer-executable instructions that, when executed, implement a method for producing an adversarial article, the method comprising the steps of:
(a) receiving input related to a specific automated visual tracking process;
(b) based on said input, generating an adversarial pattern for said specific automated visual tracking process; and
(c) applying said adversarial pattern to an article to thereby produce said adversarial article,
wherein a normal processing mode of said specific automated visual tracking process is disrupted when an image of said adversarial article is processed by said automated visual tracking process.

BRIEF DESCRIPTION OF THE DRAWINGS

The present invention will now be described by reference to the following figures, in which identical reference numerals refer to identical elements and in which.

DETAILED DESCRIPTION

The description below provides details regarding novel systems and methods relating to adversarial articles for disrupting automated tracking processes. In addition to this, the description below expands the definition of an adversarial example, from an imperceivable perturbation of a source image, to an image with any shapes or colors, but one that inconspicuously does not look like the tracked target when seen by a human.

Figure 1:
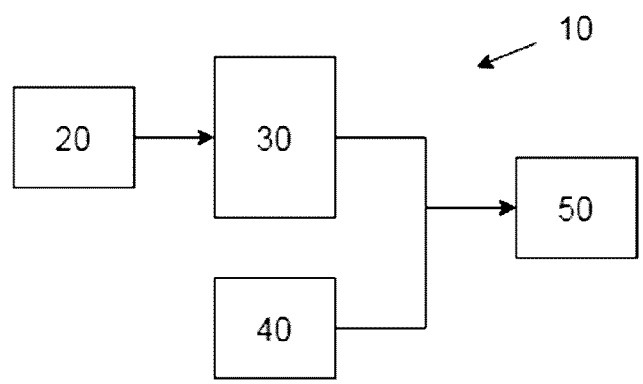
FIG. 1 is a block diagram of a system according to one aspect of the invention.

The present invention provides a system and method for producing real-world adversarial articles that can disrupt the normal processing modes of specific automated visual tracking processes (which, of course, may be a visual object tracking process). Referring now to FIG. 1, a block diagram of a system according to one aspect of the invention is illustrated. The system 10 has an input module 20 that receives input related to a specific automated image recognition process. The input module 20 then communicates with a pattern-design module 30 and passes information related to the specific automated visual tracking process to the pattern-design module. The pattern-design module 30 then generates an adversarial pattern based on that information—that is, an adversarial pattern designed to disrupt the specific automated visual tracking process. The adversarial pattern is then applied to a physical article 40 to thereby produce an adversarial article 50.

The physical article 40, and thus the adversarial article 50, may take many forms. For instance, the article may be a poster or banner, or other large display. Additionally, in some cases, the article used may be an electronic display that may be used to display many different adversarial patterns, and/or other media. (For instance, a personal computing device might be configured to display an adversarial pattern in response to a certain signal and to display a different adversarial pattern in response to a different signal.) Many other articles may be used, including garments, walls of buildings, vehicles, and so on, including any other two-dimensional surface or three-dimensional object. Note however that, for practical reasons, it may be preferable to only use stationary articles, or articles that would not travel with the individual. Similarly, some articles may be too small to effectively disrupt the tracker.

As should be understood, the adversarial pattern, which will usually comprise multiple colours, may be applied to the article 40 using any suitable means. For instance, the pattern may be painted on to die article 40 using conventional paints. Likewise, if the article 40 comprises cloth, the pattern may be applied using dyes. As an alternative, in some cases, the article 40 may be initially designed with the adversarial pattern 'built-in'. For instance, if the article 40 is made of molded plastics, the article 40 could be formed using plastics of multiple colours that together form the adversarial pattern. It should be noted, however, that such an implementation may often be impractical due to the detail and precision required in such adversarial patterns. (Additionally, as would be understood by a person of skill in the art, the same adversarial pattern may be applied to many separate articles.)

In other cases, the pattern may be applied using a light array. For instance, an electronic display may use its integrated light systems to display one or more adversarial patterns. Such a display may be a standalone article or may be integrated with another kind of article, such as a vehicle. As another example, the pattern may be projected on a surface by a light projection system. Such an implementation could thus allow multiple different patterns to be applied to a single article 40. This implementation would also permit the pattern to be 'turned off' when not needed, and thus hidden from view when not needed. In these cases, the adversarial pattern could be considered 'transitory'. In another implementation, the display may show differing adversarial patterns to account for the possibility of multiple trackers using differing tracking/image recognition processes.

In one embodiment, the input module 20 passes the input directly to the pattern-design module 30. In other embodiments, however, the input module 20 determines at least one characteristic of the specific automated visual tracking process, based on the input received. In such embodiments, the input module 20 then passes information on that at least one characteristic to the pattern-design module 30, rather than the raw input data itself. Such an embodiment may be preferable depending on the configuration of the system, for instance by reducing the amount of data that must be transmitted.

Additionally, in some embodiments, the input module 20 receives input directly from a user. That is, in such embodiments, a human user with knowledge of the specific tracking system would provide input related to that system. In other embodiments, the input module 20 may include sensor units that gather environmental information, such as GPS data. That information could then be used to infer characteristic(s) of the tracking system. Such an embodiment would require prior knowledge of possible tracking systems. Additionally, such an embodiment would preferably be used with a 'transitory' adversarial article, such as a light pattern on an electronic display.

As would be understood, some embodiments of the present invention require some knowledge of the specific object tracking system used. As mentioned above, many object trackers comprise machine learning modules, and frequently comprise convolutional neural networks (CNN). There are several kinds of trackers using CNNs, including: saliency-based trackers; segmentation-based trackers; regression-based trackers; and template-based trackers, as well as tracking-by-detection systems. Each tracker type, and each specific tracker, may respond differently to different adversarial patterns. Thus, in some embodiments, the input to the pattern-design module 30 may include data/information about the tracking system/process as well as data relating to the actual tracking. For some embodiments, this data/information regarding the tracking process may include the model of the tracking process while data relating to the actual tracking may include images of a target being tracked by the tracking process. Based on these data input, the pattern-design module can generate one or more adversarial patterns.

The pattern-design module 30 thus generates an adversarial pattern that can be related to the specific tracker. In some cases, the adversarial pattern will 'distract' the tracker, disrupting the visual perception component by causing it to 'focus' on the adversarial article, for instance as if the article looked like the tracked target to the specific tracker. The pattern-design module 30 may, in some cases, be a rules-based module. It should, however, be clear that other possible pattern-design modules and methods may be used. These pattern-design modules may make use of machine-learning based approaches that are known to be more robust than rule-based approaches. Such machine-learning based approaches may include running an optimization algorithm over a model's parameters (i.e. model weights) or building and using a Generative Adversarial Network (GAN). (For further description of adversarial generation, refer to Athalye et al, "Synthesizing Robust Adversarial Examples", ICML 2018. A copy of this article can be found at https://arxiv.org/pdf/1707.07397.pdf and the entirety of its contents are therefore incorporated herein by reference.) In other implementations, the pattern-design module 30 may comprise both rules-based and machine-learning-based elements.

It should be noted that the disruption to the automated visual tracking process using an adversarial article according to the present invention would be only temporary. That is, no permanent damage would be done to the tracker or to any system on which the tracker was mounted. The tracker would simply be 'distracted' while the adversarial article was in view, thus allowing a person to evade tracking.

Figure 2:
FIG. 2 shows a progression of images where a tracker tracks and applies a bounding box around a subject.

Referring now to FIG. 2, a progression of images are shown to illustrate the performance of the invention. The image shows a trajectory of the tracker (in this case the well-known regression-based GOTURN system (Held et al, "Learning to Track at 100 FPS with Deep Regression Networks", ECCV 2016, the entirety of which is incorporated herein by reference)) while tracking a man walking from left to right in front of a non-adversarial article (in this case, the non-adversarial article is a poster or 'billboard'). In this situation, tracker has correctly applied a bounding box to the man's image (the green box).

Figure 3:
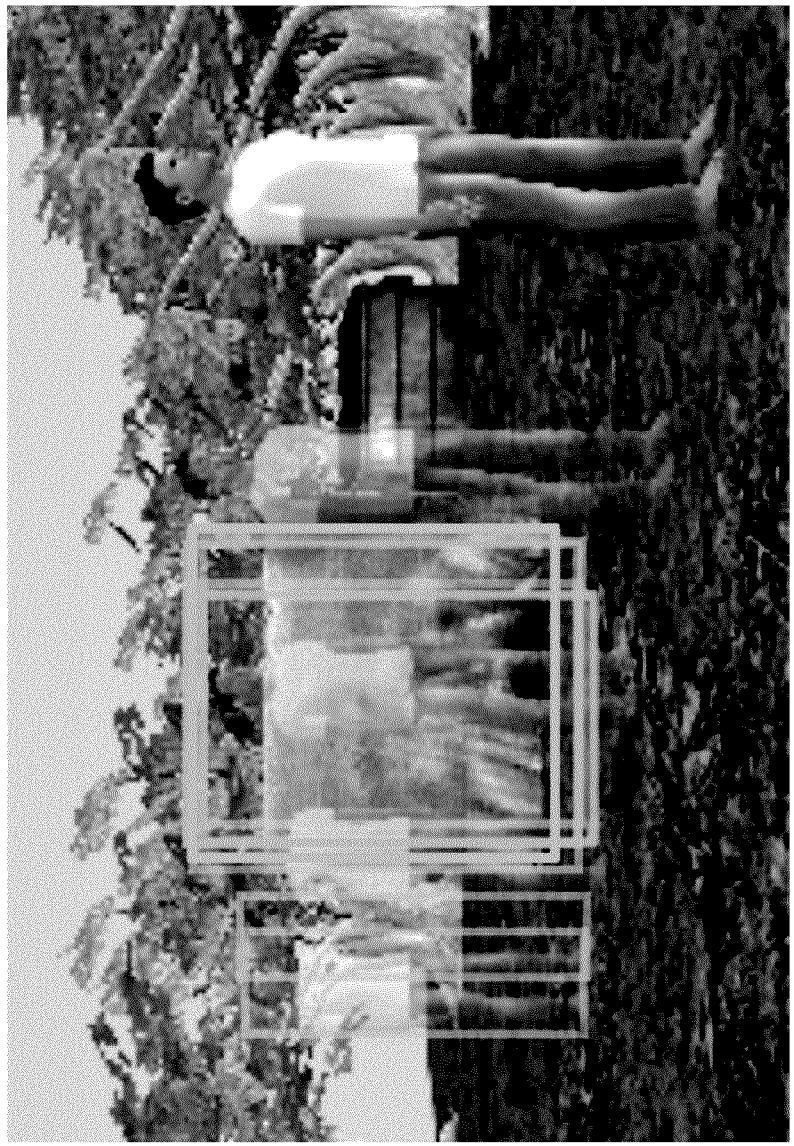
FIG. 3 shows a progression of images similar to that in FIG. 2 but where an adversarial pattern/article has been inserted to thereby confuse the tracker, thereby causing the tracker to place a bounding box around the adversarial pattern/article and not the subject.

In FIG. 3, the progression of images shows the man walking from left to right but with a synthetic image of an adversarial article being added. As can be seen, the tracker is confused by this technique and has placed a bounding box around the article (the poster) and not the man. If the man wished to escape detection at the point, he could easily step out of frame.

As can be seen, aspects of the present invention can operate in the virtual realm by adding artifacts to images in the virtual realm. These artifacts can be used to circumvent tracker processes that are using the images for tracking purposes. However, one of the main advantages of the present invention is that it allows for the creation of adversarial artifacts in the physical world. Such adversarial artifacts can be used to circumvent various tracking systems simply by being present in the field of view of the sensor swath of a tracking system. These adversarial artifacts do not need to intercept and/or distort the digital transmission or connection between a tracking system's input module and pattern-processing module.

Figure 4:
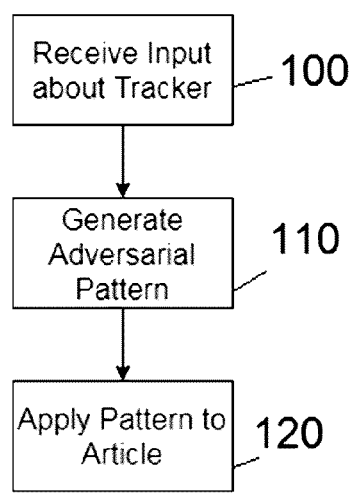
FIG. 4 is a flowchart detailing a method according to one aspect of the invention.

FIG. 4 is a flowchart detailing a method according to one aspect of the invention. Input related to the specific automated visual object tracking process is received at step 100. At step 110, and based on that input, an adversarial pattern to disrupt that automated visual object tracking process is generated. Then, at step 120, that pattern is applied to an article, as discussed above.

For clarity, in some implementations of the present invention, step 100 can include receiving access to the visual tracking process where the process is a model that can be transparently examined or, alternatively, access to the process can take the form of an accessible API of a blackbox model. For such implementations, prior to step 110, an intermediary step is taken, that of receiving input images of a target being trucked in one or more backgrounds. Alternatively, access to a 3D textured model of a target and to a graphical simulation framework (e.g. a video game engine) may be provided. These can then be used to synthesize images of the target in diverse simulated scenes.

Figure 5:
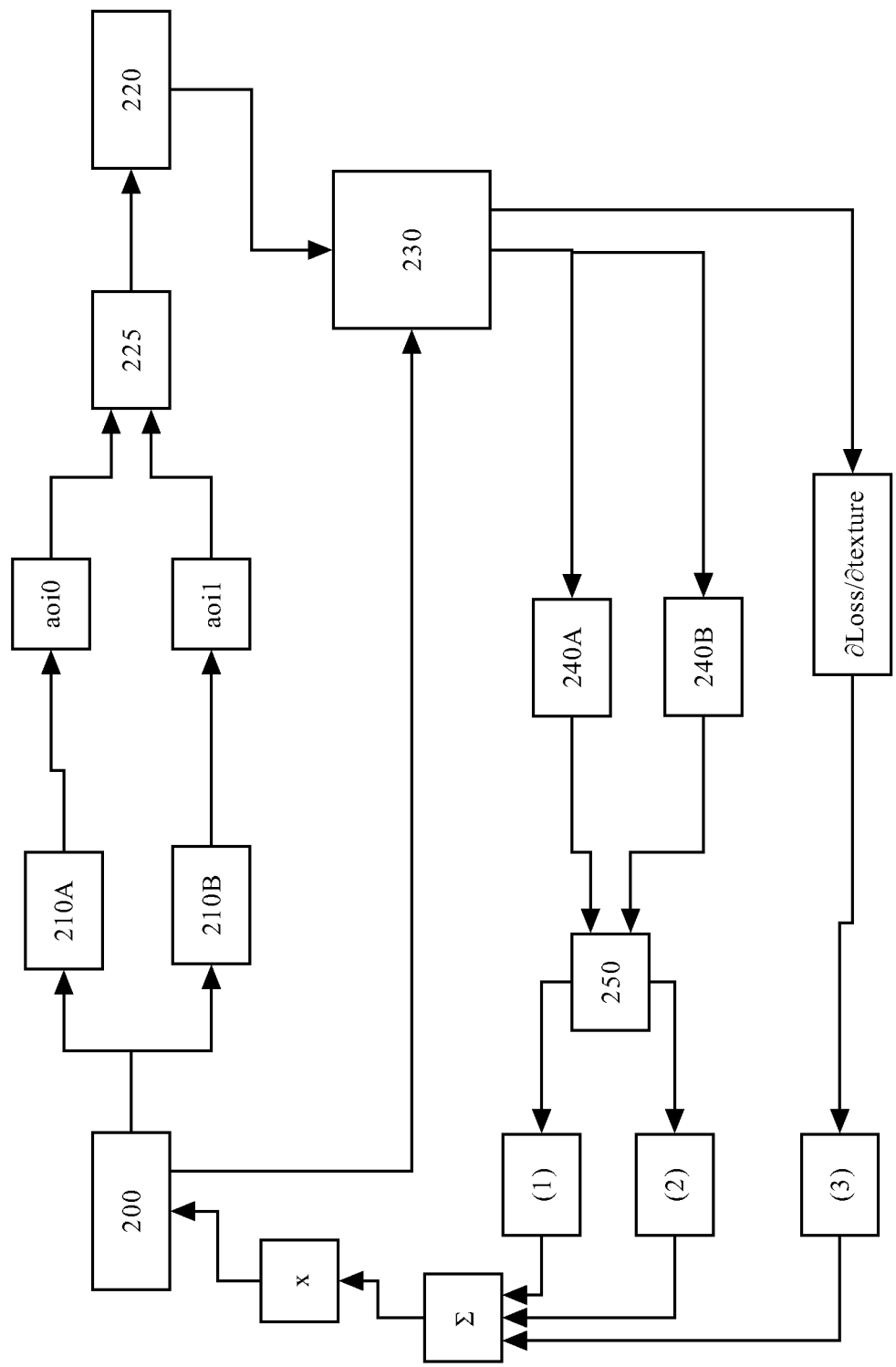
FIG. 5 is a block diagram illustrating the logic flow of another method according to another aspect of the present invention.

Referring now to FIG. 5, a block diagram of a method according to one aspect of the present invention is presented. This aspect of the present invention provides for a method that generates textures that can be used to fool a tracking process or module (e.g. a visual object tracking process). Other methods to generate similar textures may, of course, be used with other aspects of the present invention.

In this aspect of the present invention, a texture 200 is first provided. This texture is then added to multiple scenes 210A, 210B as viewed by a target tracker with a target being tracked by a tracking module. The tracking module implements a tracking method or algorithm to find, segment, and track the target. These scenes 210A, 210B are then cropped and focused on an area of interest ($aoi_0$ and $aoi_1$) where the tracking module is searching for the target. A prediction as to the projected bounding box is then made (the prediction being bounding box 220) for the cropped images by the tracking module 225. Based on the information from the projected bounding box 220, various loss objectives are determined using a loss module 230. These various loss objectives are determined to confuse the tracker in various manners. For instance, these loss objectives may include $L_{non\text{-}targeted}$, $L_{integrated}$, $L_{guided}$, $L_{TV}$, $L_{perc}$. This aspect of the invention computes changes to the pixel values of the texture by minimizing the combination of loss objectives using some form of optimization method. (As would be understood by the person skilled in the art, many optimization methods are known in the at, and some may be preferable for certain purposes.)

To better explain the 'loss objectives' mentioned above, these may be defined as:

$L_{targeted}$ refers to a loss term that measures the distance between the predicted target's bounding box and an adversarial "target" bounding box having coordinates that the attacker specifies.

$L_{non-targeted}$ refers to a loss term that does not depend on an extra adversarial "target" output. Instead, this loss is typically the negated value of the loss objective used to train the tracker module. That is, the goal of this type of loss is to maximize the distance between the predicted bounding box and the bounding box of the tracked target.

$L_{guided}$ is a loss term that requires information from the attacker, but not in the explicit form of an adversarial target. Instead, for this loss term, the attacker specifies desirable properties for the prediction bounding box, such as a preference for "growth in area" or a preference for "predicting small values", etc.

$L_{TV}$ is an auxiliary loss term (called total variation) which minimizes the distance between adjacent pixel values in the texture. This term may be used to produce a smoother texture, allowing the texture to be more easily printed. This also allows for the texture's appearance to remain similar when viewed at various distances.

$L_{perc}$ is a perceptual loss term. In some embodiments, a user may want to generate an adversarial texture that is perceptually or visually similar to a source image. In such cases, this term is defined as the distance between the texture image and the source image, under a given color space. The well-known RGB color space is typically used, but other color spaces, including CIELab, may be used.

It should be clear that the above list of loss objectives is not an exhaustive list and that other loss objectives may be used. As well, it should be clear that the loss objectives may not necessarily be based on the projected bounding box. As can be seen from the figure, the loss parameters may be determined from or calculated using the actual texture itself.

The two focused images ($aoi_0$ and $aoi_1$) are then processed to remove the background and to place the texture squarely in the frame. This results in images 240A, 240B that have both the target and the texture in the frame. A de-rendering process 250 is then applied to the frame for each image. The de-rendering process reverses the effects of ray tracing on the image pixels of the texture that is not obscured by the target in the frame. This de-rendering process produces $$\frac{\partial L}{\partial frame_0} \cdot \frac{\partial frame_0}{\partial texture} \quad (1)$$

and $$\frac{\partial L}{\partial frame_1} \cdot \frac{\partial frame_1}{\partial texture}. \quad (2)$$

A separate process uses $$\frac{\partial Loss}{\partial aoi_0} \text{ and } \frac{\partial Loss}{\partial aoi_1}$$

from the loss module 230 to produce $$\frac{\partial L}{\partial texture}. \quad (3)$$

These three, (1), (2), and (3) are then summed up and perturbed by a specific step size (i.e., the sum of the three is multiplied by a predetermined value) to result in the texture to be used in the next iteration of the method.

The above steps can be abstracted as obtaining the loss objective and then analytically differentiating the loss objective with respect to the texture. The image rendering process is then reversed when contributing to the texture's gradient in the two frames or images. Note that this reversal may involve realizing where the poster or texture is placed relative to the camera, as well as knowing where the light sources are, and knowing the obstructions to the texture, etc.

It should be clear that the method outlined above and in FIG. 5 may be iterated multiple times using multiple images of multiple scenes as viewed by a tracking module. Once the tracking module is unable to produce a suitably close bounding box around the target, then the texture that has caused this inability can then be used to spoof or fool tracking modules that use a similar tracking algorithm. Alternatively, the attack process can terminate when, after synthesizing the sequences of frames where the target is initially being tracked, as the target moves across the poster, the tracker's predictions stop following the target. Of course, the method may be practiced on various tracking modules and algorithms and the resulting textures that cause the various tracking modules to stop being able to produce bounding boxes may be combined into a single texture that may be used against multiple different tracking modules.

It should also be clear that, while the above implementation attacks a tracking model that takes in as input 2 frames, the approach can be generalized to be applicable to other tracking models that take in, as input, multiple frames. The approach is applicable to tracking models that takes in N frames (successive or independent frames) as well as recurrent tracking models (e.g. tracking models that are implemented as a Recurrent Neural Network) that maintain an internal "hidden state" that is produced and updated after seeing a sequence of frames. As long as these input frames (e.g. N frames, the recurrent hidden state, etc.) can be generated under diverse scenarios and under different imaging conditions, the above noted approach should work, especially once the system parameters have been well-tuned.

Loss Value Experiments

Multiple experiments were run to test the effect of different loss values on adversarial impact. That is, the experiments evaluated the effectiveness of adversarial patterns with certain combinations of loss values in evading or blocking specific tracking model. However, nothing in these tests should be construed as limiting the scope of the invention in any way. These tests simply simulate potential implementations of the invention. Many more implementations, again including physical implementations, are possible.

The experiments were run using the well-known Gazebo simulator. Several "scenes", including indoor and outdoor locations, were simulated, and simulated targets (humans and robots) were added to the scenes. Two separate GOTURN tracking models were used; for the purposes of these tests, the models were trained on images of the simulated targets. Additionally, in these tests, the details of the tracking models were known (thus input about the models was provided by a human user). Then, articles bearing adversarial patterns (banners and posters) were added to the scenes. In some of the tests, non-adversarial patterns were used to provide a baseline. A set of default hyperparameters, including a maximum number of attack iterations and the size of the scenes, was used to reduce irrelevant variations between the tests.

The well-known mean-Intersection-over-Union-difference (μIOUd) metric was used to compare the effectiveness of different adversarial patterns. In general, these tests found that patterns with μIOUd of approximately 0.2 confused the tracking algorithms while the target was in front of the adversarial article. However, in these situations, the algorithms were able to 'recapture' the targets once the targets had moved away from the article. Trackers confronted with patterns having μIOUds of approximately 0.4 or higher, however, consistently lost track of their targets and were not able to recapture them.

Loss Objective Type

Figure 6A:
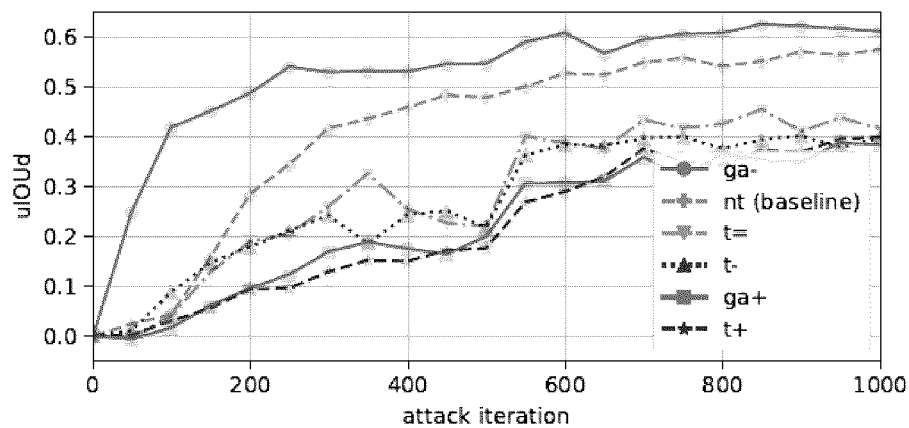
FIG. 6A is a chart showing adversarial strengths resulting from one tested implementation of the invention, for several potential loss objectives.
Figure 6B:
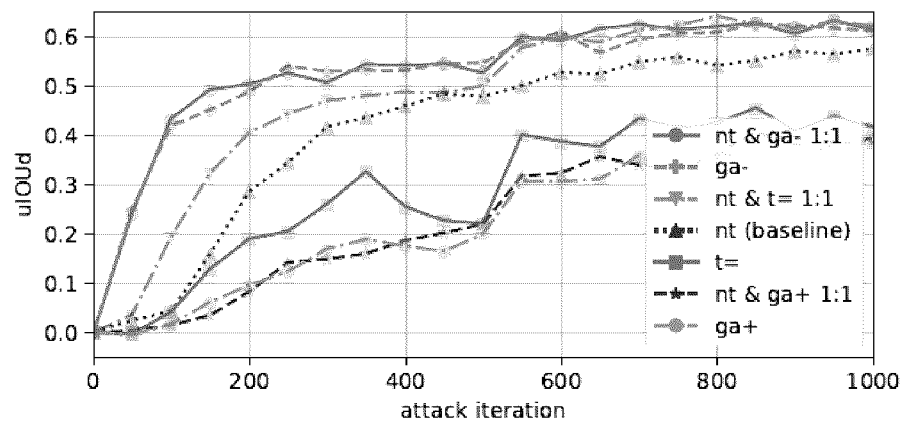
FIG. 6B is a chart showing adversarial strengths resulting from the implementation of FIG. 6A, for several other potential loss objectives.

Some of the tests focused on the impact of different loss objectives on the relative adversarial strength of a given model. As discussed above, numerous loss objectives are possible, including "guided", "targeted", and "non-targeted". FIG. 6A is a chart showing the adversarial strength of loss objectives resulting from six different loss objectives. In general, where the loss objective was more targeted, the adversarial pattern was less successful at redirecting the tracker. An exception to that statement, however, was the ga-loss, a guided loss that encouraged shrinking the area of each predicted bounding box. The adversarial strength of the ga-loss was the highest of those tested. Other losses tested in FIG. 6A were a non-targeted loss (nt), a same-size target loss (t=), an unguided shrinking target loss (t−), an unguided expanding target loss (t+), and a guided loss that encouraged expanding the area of each predicted box. Hybrid losses were also tested, shown in FIG. 6B. As can be seen, trackers that combine two or more loss objectives may in some cases be more vulnerable to adversarial patterns.

Scene Characteristics

Figure 7A:
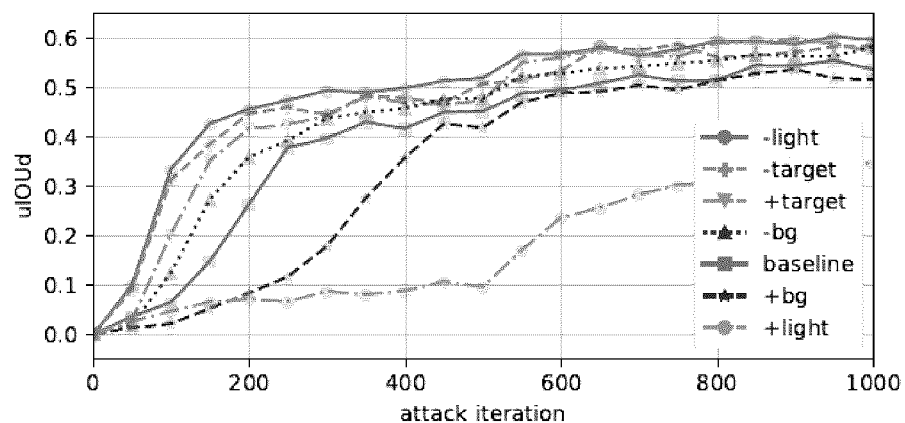
FIG. 7A is a chart showing the effects of varying scene characteristics in the implementation of FIG. 6A.

Another set of tests focused on reducing or increasing the level of variety in several characteristics of the scene, including the target, the background, and the lighting. With the exception of increased variety of lighting, these changes had little effect. However, as can be seen in FIG. 7A, when there was more variation in the lighting styles applied to a scene (represented as +light), the adversarial pattern took longer to confuse the tracking algorithm than in other scenarios.

Figure 7B:
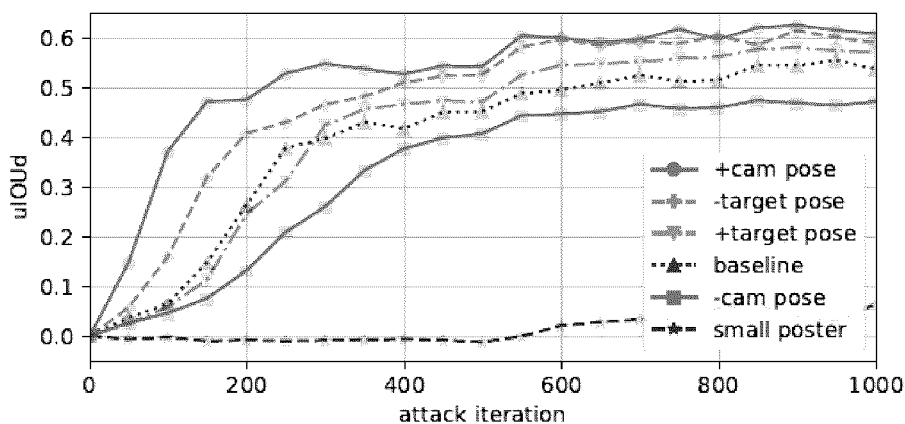
FIG. 7B is a chart showing the effects of varying different scene characteristics in the implementation of FIG. 6A.

Other tests focused on camera and target position, and the size of the adversarial poster. As seen in FIG. 7B (the small poster line), the adversarial effect was negligible when the poster size was halved. Again, however, note that this failure arises from the specific tracking models, scenes and target images, and adversarial patterns tested hem. In other situations, small articles may effectively disrupt and confuse trackers. Nothing in these tests should be taken as limiting the potential implementations of this invention.

Also in FIG. 7B, the results of changing the 'camera' position (the angle of view for the scene) are shown as +cam pose and −cam pose. The differences between these results suggests that, when there are a large variety of camera angles, a longer runtime may be required to achieve the same adversarial strength as the baseline adversarial pattern. +target pose and −target pose show the differences resulting from varying the position of the target: in particular, when there was little variation in the target's position (−target pose), the convergence to the baseline is faster than when there were many potential positions.

Imitation Patterns

Figure 8:
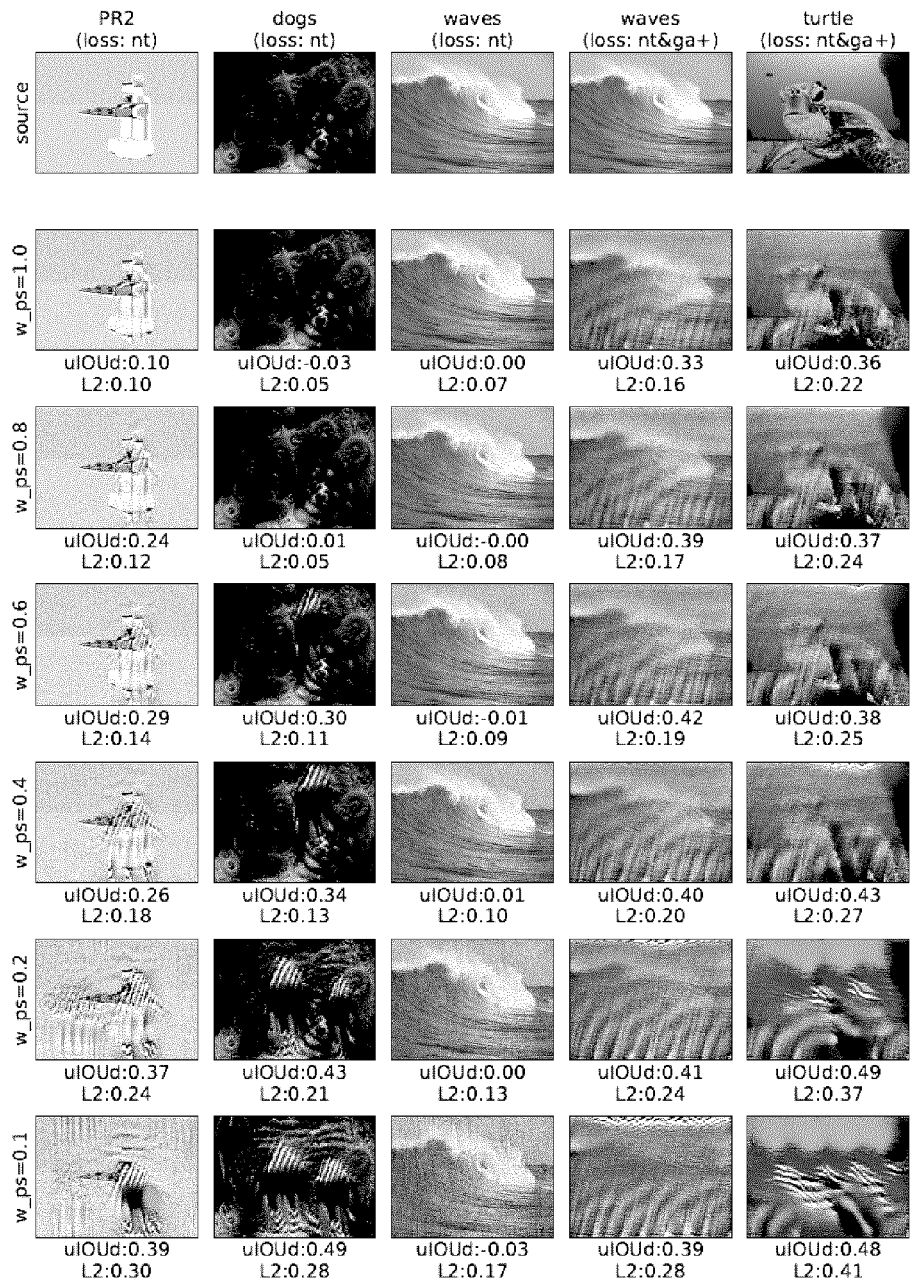
FIG. 8 shows multiple source images and adversarial patterns based on those source images.

As discussed above, in certain implementations it may be desirable to produce adversarial articles that resemble other, innocuous articles. In such cases, the 'perceptual loss' may be shaped by adding a 'perceptual similarity weight', $w_{ps}$. A source image is then perturbed based on that perceptual loss term, to produce an adversarial image. The larger the perceptual similarity weight value, the more similar the source image and the adversarial image will be. FIG. 8 shows several source images and the adversarial images that result from each, for a range of selected perceptual similarity weights. The source images are in the top row of the figure. The adversarial strength of each pattern is given by the μIOUd value shown underneath each image, and the perceptual difference between the adversarial images and their source images is given by the $L_2$ values (where $L_2$ is the Euclidean distance between the images in RGB color space).

Figure 9A:
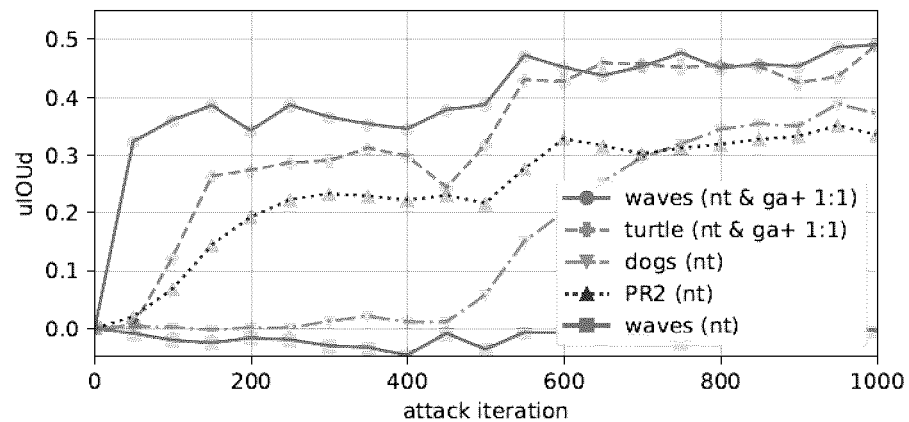
FIG. 9A is a chart showing adversarial strength for some of the images in FIG. 8.
Figure 9B:
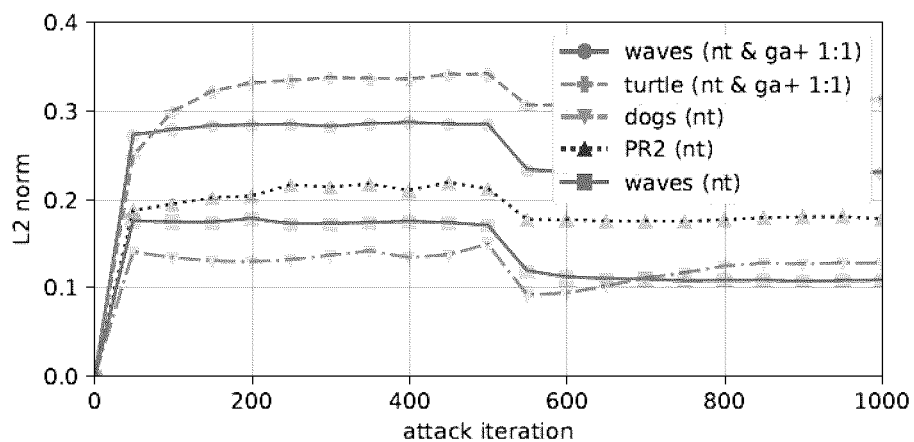
FIG. 9B is a chart showing perceptual similarity for some of the images in FIG. 8.

As can be seen, some of the adversarial patterns develop in distinct ways. In particular, some of the images develop "stripy patches", that is, dark striped regions. For instance, these regions are visible on the 'dogs' image where the $w_{ps}$ value is 0.6 or lower. In the experiments performed, these patches were highly adversarial and consistently confused the tested models. (Again, this experiment should not be taken as limiting the invention: for other tracking models or different adversarial-pattern generating algorithms, these "stripy patches" may be insignificant. There may be other trends evident in other tracking situations, or there may be no discernable trend at all. The varied success of the adversarial patterns from the source images tested is evident in FIG. 9A, which shows adversarial strength for the images with a $w_{ps}$ value of 0.6, and in FIG. 9B, which shows perceptual similarity for the images with a $w_{ps}$ value of 0.6.

In general, lower perceptual similarity weight values allowed the generation of stronger adversarial images, while higher perceptual similarity weight values made generating strong adversarial images more difficult. The choice of $w_{ps}$ value may vary, depending on the desired application: some implementations of the invention may be more suited to slower or weaker adversarial patterns that have a high degree of similarity to non-adversarial designs. However, in other implementations, strong and/or fast adversarial action may be preferred over visual similarity.

In addition to the above, the method may be used on textures or images that are recognizable to the human eye and the method may be used only on specific pixels in that human recognizable image/texture. This allows specific pixels of that human recognizable image to be adjusted (as a texture on its own) so that the human recognizable image can be used to fool or spoof tracking modules while the human recognizable image is still clearly recognizable to humans. Accordingly, the human recognizable image with the adjusted pixels could be used as an innocuous background texture (such as a poster, or a television image) in pictures or frames while similarly serving to fool target tracking modules.

Real-World Tests

In addition to the simulated experiments, some real-world implementations of the invention were tested. These implementations used adversarial patterns generated according to the methods described above, and displayed on a large television screen in an indoor environment with static lighting. The tests examined both 'tracking' systems, in which a tracking model ran on data received from a stationary camera, and 'servo-ing' systems, in which a drone following the target was guided by the target's predicted locations. In general, the adversarial effects were stronger where the camera remained stationary, as opposed to where it was used to guide a drone.

Figure 10:
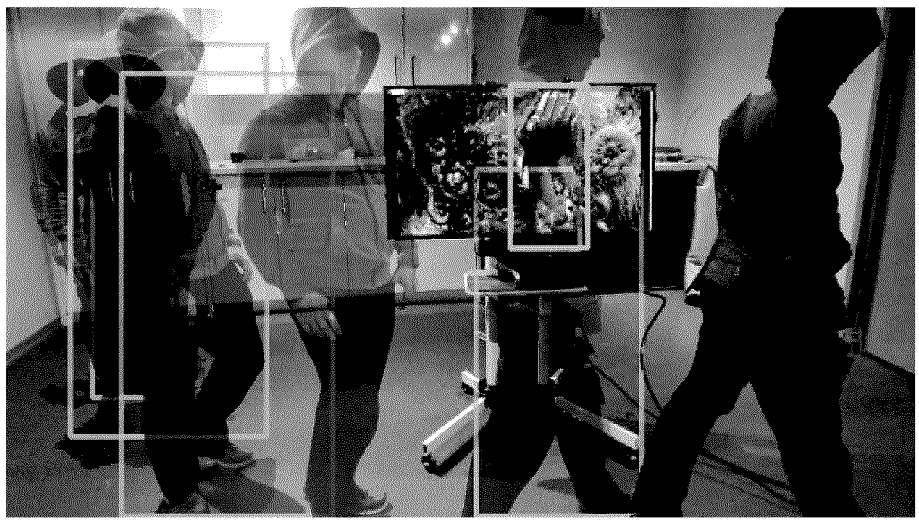
FIG. 10 is a time-lapsed picture showing stages of a real-world tracking process with an adversarial pattern displayed on a screen.

FIG. 10 is a time-lapsed picture of one of these physical tests, showing tracking of a person over time. The screen is displaying an adversarial pattern generated by perturbing a source image. Both the camera with the tracking model and the television screen were stationary during this test. The person being tracked begins on the left side of the image, to the rear of the screen. The person moves forward (towards the camera) and then to the right, passing in front of the screen. As can be seen, while the person walked forward and before they passed in front of the screen, the tracking box stayed approximately with them. However, once they were past the screen, the tracking box did not follow. Rather, the tracking box remained 'stuck' on the adversarial pattern, and the person escaped. Again, this electronic display is just one possible implementation of the invention.

Figure 11:
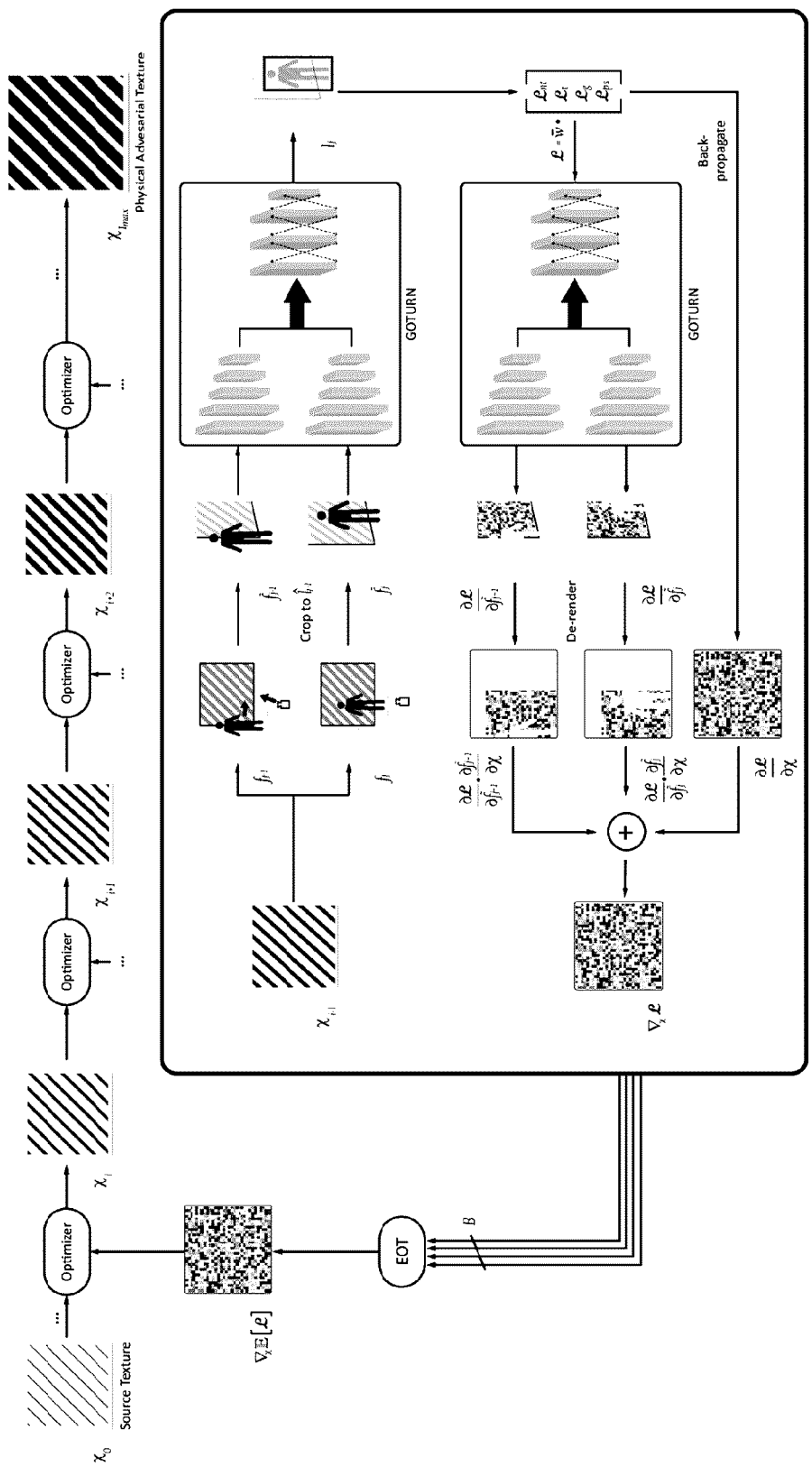
FIG. 11 is a block diagram illustrating a variant of the method detailed in FIG. 5.

FIG. 11 illustrates a variant of the method shown in FIG. 5. FIG. 11 shows the overall procedure for generating a Physical Adversarial Texture (i.e., an adversarial pattern for an adversarial article). Starting from a source texture $\chi_0$, we perform a minibatch gradient descent on L to optimize pixel perturbations that adds onto the texture, for a total of $I_{max}$ iterations. On each iteration i, we apply EOT (expectation over transformation method that minimizes the expected loss) to a minibatch of B scenes, each with randomized settings for the poses of the camera, target, and poster, the identities of the target and background, and the hue-saturation-value settings of a single directional light source.

Each scene entails two frames $\{f_{j-1}, f_j\}$, in which both the camera and tracked target may have moved between the previous and current frames. Given the target's previous actual location $\hat{l}_{j-1}$, we crop both frames around a correspondingly scaled region, then resize and process them through the GOTURN network, to predict the bounding-box location $l_j$ of the target in the current frame. We then back-propagate from the combined loss objective L onto the texture space through all partial-derivative paths. After repeating the above process for all B scenes, we compute the expected texture gradient, and update the texture using the Fast Gradient Sign optimizer, scaled by the current iteration's step size $\alpha_i$:

$$\Delta\chi = -\text{sign}(\nabla_\chi \mathbb{E}[\mathcal{L}])$$

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs. Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for producing an adversarial article, said method comprising the steps of:
   (a) receiving input related to a specific automated visual tracking process;
   (b) based on said input, generating an adversarial pattern for said specific automated visual tracking process; and
   (c) applying said adversarial pattern to an article to thereby produce said adversarial article,
   wherein a normal processing mode of said specific automated visual tracking process is disrupted when an image of said adversarial article is processed by said automated visual tracking process.

2. The method according to claim 1, wherein said specific automated visual tracking process is performed by a system mounted on an autonomous vehicle.

3. The method according to claim 1, wherein, based on said input, at least one characteristic of said specific automated visual tracking process is determined, and wherein said adversarial pattern is based on said at least one characteristic.

4. The method according to claim 1, wherein generating said adversarial pattern in step (b) is automatic.

5. The method according to claim 1, wherein generating said adversarial pattern in step (b) is performed using a machine-learning-based module.

6. The method according to claim 1, wherein said article comprises at least one of: a poster; a banner; a wall; a vehicle; a garment; an electronic display; a virtual object; a two-dimensional surface; and a three-dimensional object.

7. The method according to claim 1, wherein said adversarial pattern is applied to said article in step (c) using at least one of pigment and light.

8. A system for producing air adversarial article, said system comprising:
- an input module for receiving input related to a specific automated visual tracking process;
- a pattern-design module for generating an adversarial pattern for said specific automated visual tracking process, wherein said generating is based on said input; and
- an article, wherein said adversarial pattern is applied to said article to thereby produce said adversarial article, and
wherein a normal processing mode of said specific automated visual tracking process is disrupted when an image of said adversarial article is processed by said automated visual tracking process.

9. The system according to claim 8, wherein said specific automated visual tracking process is performed by a system mounted on an autonomous vehicle.

10. The system according to claim 8, wherein said input module determines at least one characteristic of said specific automated visual tracking process, and wherein said adversarial pattern is based on said at least one characteristic.

11. The system according to claim 8, wherein said pattern-design module comprises a machine learning-based module.

12. The system according to claim 8, wherein said adversarial pattern is hidden within a source image.

13. The system according to claim 8, wherein said article comprises at least one of: a poster; a banner; a wall; a vehicle; a garment; an electronic display; a virtual object; a two-dimensional surface; and a three-dimensional object.

14. The system according to claim 8, wherein said adversarial pattern is applied to said article using at least one of pigment and light.

15. Non-transitory computer-readable media having encoded thereon computer-readable and computer-executable instructions that, when executed, implement a method for producing an adversarial article, the method comprising the steps of:
- (a) receiving input related to a specific automated visual tracking process;
- (b) based on said input, generating an adversarial pattern for said specific automated visual tracking process; and
- (c) applying said adversarial pattern to an article to thereby produce said adversarial article, wherein a normal processing mode of said specific automated visual tracking process is disrupted when an image of said adversarial article is processed by said automated visual tracking process.

16. The computer-readable media of claim 15, wherein said specific automated visual tracking process is performed by a drone-mounted system.

17. The computer-readable media according to claim 15, wherein generating said adversarial pattern in step (b) is automatic.

18. The computer-readable media according to claim 15, wherein generating said adversarial pattern in step (b) is performed using a machine-learning-based module.

19. The computer-readable media according to claim 15, wherein said article comprises at least one of: a poster; a banner; a wall; a vehicle; a garment; an electronic display; a virtual object; a two-dimensional surface; and a three-dimensional object.

20. The computer-readable media according to claim 15, wherein said adversarial pattern is applied to said article in step (c) using at least one of pigment and light.

* * * * *